Nov. 1, 1966  A. W. PROSSER  3,282,057
UNDERGROUND LINE AND METHOD OF INSTALLING SAME
Filed July 12, 1961

INVENTOR.
Adam W. Prosser
BY
AGENT

United States Patent Office 3,282,057
Patented Nov. 1, 1966

3,282,057
UNDERGROUND LINE AND METHOD OF
INSTALLING SAME
Adam W. Prosser, Midland, Mich., assignor to The Dow
Chemical Company, Midland, Mich., a corporation of
Delaware
Filed July 12, 1961, Ser. No. 123,504
16 Claims. (Cl. 61—72.1)

This invention relates to a method for the installation of underground lines and more particularly relates to the method of providing indicia for the locating of underground lines during excavation.

The term "lines" as employed herein relates to conduit or conductors, such as electrical power transmission, or signal transmission cables as well as conduit and pipe lines for conveying solids, liquids and gases.

In the past, much difficulty has been encountered in excavating lines which had been buried for an appreciable amount of time, particularly where large quantities of backfill must be removed and some uncertainty exists as to the exact location of the underground lines. For example, buried power or water lines are often designated as being located a given number of feet below the surface of the ground or from some reference or bench mark. Over the course of years frequently reference marks disappear, various construction projects may alter the ground level, and consequently, when repairs are needed, the precise location of the line is indefinite. The excavation of such lines at this point is generally a hit and miss operation wherein the approximate location of the line is estimated and rather cautious digging, either manually or with power equipment, is undertaken. Oftentimes, an erroneous estimate will result in damage to the line being excavated or other lines which were not expected to be at the location.

Certain electronic techniques have been developed to assist in the location of such lines during excavation such as capacitance operated relay signal systems and generally similar techniques. These, however, are generally considered to be somewhat of a nuisance by some construction crews and often do not find great favor when they are most needed. Haphazard or careless excavation, particularly with power equipment and often with manually operated equipment is hazardous to the personnel engaged in the operation. This is particularly true when the underground lines are carrying toxic chemical material or electric supply lines.

It is an object of this invention to provide a new improved method for the installation of underground lines having incorporated therewith excavating indicia.

It is still a further object of this invention to provide a permanent excavating indicating means in association with the underground line.

It is a further object of this invention to provide a method of backfilling an excavation for line which will provide a permanent readily recognizable indicia located adjacent the level of the buried line.

These benefits and other advantages are readily achieved in accordance with the invention by providing an excavation adapted to receive the underground line, placing a line therein, partially backfilling said excavation, placing within said partially backfilled excavation a plastic member and subsequently completing backfilling of the excavation.

Other benefits and advantages will become apparent from the following specification when taken in conjunction with the drawing wherein.

Figure 1:
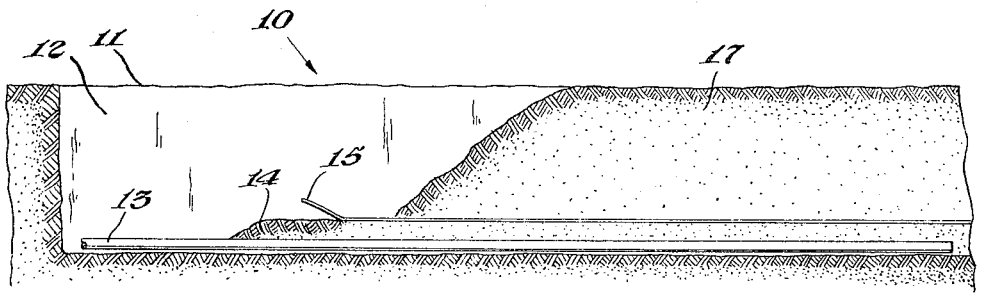
FIGURE 1 depicts an underground line installation in accordance with the invention.

In FIGURE 1, there is schematically shown a sectional view of a partially completed underground line installation generally indicated by the reference numeral 10. The installation comprises the earth or ground 11, having formed therein an excavation 12. Within the excavation 12 is a line 13 covered by a small layer of backfill 14 over which is placed a plastic indicating means 15. Over the indicating means 15 is positioned the remainder of the required backfill designated by the reference numeral 17.

Figure 2:
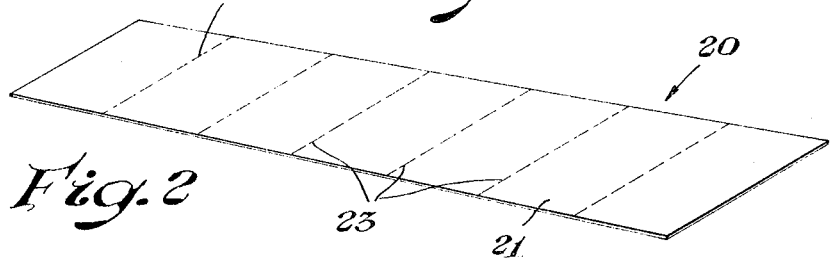
FIGURES 2, 3 and 4 show alternate forms of indicia in accordance with the invention.

In FIGURE 2 there is illustrated an alternate form of plastic indicating means designated by the reference numeral 20. The indicating means 20 comprises a continuous strip 21 defining a plurality of weakened areas 23 extending transversely to its major dimension.

Figure 3:
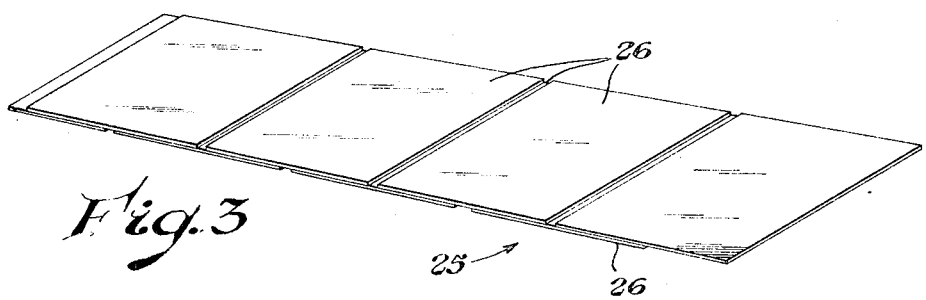
Figure 4:
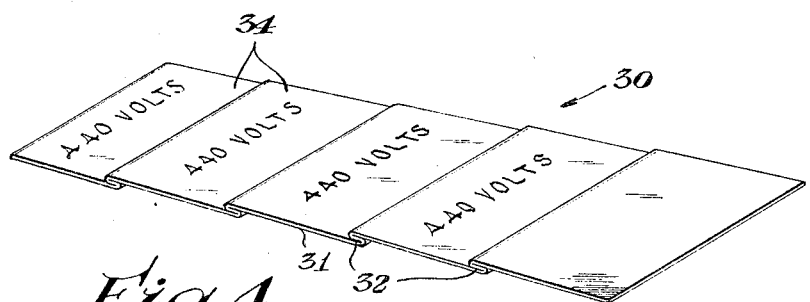

An alternative arrangement is shown in FIGURE 3 where an indicating means 25 is formed from a plurality of overlapping sheets 26. An extensible embodiment of an indicating means 30 comprising a strip 31 having a plurality of pleats or folds 32 formed therein and bearing identifying printing 34 is shown in FIGURE 4.

Excavating indicia in accordance with the invention are readily installed during the backfilling operation by a variety of means.

Indicating sheets or film similar to 15 of FIGURE 1 or the perforated embodiment of FIGURE 2 are readily stored prior to use in the form of a large supply roll containing many hundreds and sometimes thousands of feet of sheet material. Advantageously these may be unwound from the supply roll directly over the layer of backfill 14. Under optimum conditions, one end of the indicating means may be secured adjacent to its desired location and the supply roll unwound by rolling over the backfill. Alternately, if a suitable pivot means or shaft is provided for the supply roll, it may be carried along above the trench and the indicating means unwound, and allowed to fall on the upper surface of the backfill layer 14. In windy locations, however, it is preferable to unwind the indicating means in the shelter of the excavation 12. The embodiment of FIGURES 3 and 4 may also be provided in the form of a long continuous length wound on a supply roll by joining the sheets 26 of the embodiment of FIGURE 3 and by securing the folds or pleats 32 of FIGURE 4 by means of low strength heat seals or adhesive bonds. Such embodiments for the purposes of installation may be wound into a supply roll by the incorporation of a slip sheet or by incorporating these embodiments between a pair of slip sheets. Such slip sheets beneficially are of organic decomposable material such as paper which, on burial within the ground for even relatively short periods of time, will decompose and lose their strength entirely.

The continuous indicating means of FIGURE 1 is particularly advantageous wherein a low cost rapidly installed indicating means is required. A continuous sheet usually is more easily installed with less possibility of damage than the embodiments of FIGURES 2, 3 and 4 if the same given weight of material per linear foot of trench is employed. The embodiment of FIGURE 2 is particularly advantageous for installation in loose soil such as sand where excavation most probably will be performed employing relatively small equipment. The perforations 23 permit ready rupture of the film and increase the probability of removal of a portion of the indicating means 20 from narrow or deep trenches where the machine operator may have a restricted view of the bottom of the excavation. The embodiment of FIGURE 3 is somewhat similar in operation, but is better adapted for installation closer to the line to be excavated than is the embodiment either in FIGURE 1 or FIGURE 2. The overlapping sheets 26 of FIGURE 3 provide relatively certain indications of the marker both in the trench and in the material being removed by the excavating implement. The pleated arrangement of FIGURE 4 is particularly advantageous where excavation is to be done employing large equipment, and more particularly when a clam-shell bucket or drag line is employed. The pleated indicating strip 30 buried in a backfilled excavation is engaged by the digging means rather than breaking on minor movement of the soil it will tend to unfold, separate from the surrounding earth before tearing, and act as an easily observed flag protruding from the load.

Usually it is beneficial to position the indicating means above the buried line. However, if maximum protection is required an indicating sheet may be placed on one or both sides of the line or alternately a single wide sheet will give indication if the buried line is approached from either side or above. Oftentimes where a line is located close to walls or footings a plastic strip is positioned above the line level and somewhat further from the wall than the line. The particular positioning and size of an indicator strip is usually determined by the reliability desired versus cost and the most probable means of excavation to be employed.

The plastic excavation indicating means employed in the practice of the invention may be prepared from the wide variety of plastic materials, desirably such plastic materials which exhibit long term stability under various underground conditions are preferred. Typical suitable materials are polyvinyl chloride, polyethylene, saran, polystyrene, and the like. Also contemplated within the scope of the invention are laminated sheets, tapes and similar shapes which may be readily fabricated from one or more such materials. Frequently, it is advantageous to employ in the practice of the invention a laminated sheet having incorporated therein fibers or filaments which tend to increase the tensile strength thereof. Where the backfill is of a rocky nature a stronger or heavier indicating means is desirable in order to resist abrasion or impact when the backfill is placed over the plastic strip. Advantageously, if both the upper and lower backfill, that is, the backfill above and below the indicating means is sand, a relatively thin or weak plastic sheet is satisfactory. Typically, the indicating means in accordance with the invention will have a thickness of from about 1 to about 20 mils depending upon the nature of the backfill being employed. For most purposes, an indicating means having a thickness of from about 5 to 10 mils is generally satisfactory. In selecting the particular weight or thickness of material used as an indicating means, consideration is given to the probable means employed for excavating the line after its burial. For example, if the line will be dug up by hand or manually, a relatively thin film will be sufficient as this can be readily observed as the hole is being dug. However, a large, deep line, such as one in which the indicating means would be 5 to 6 feet or more below ground level, would most probably be excavated by means of power equipment such as a black hoe, drag line, clam shell bucket or similar devices which remove a relatively large quantity of the backfill at a time. Thus, the strength of the film should be sufficient that it will not break or shear in the same place that the backfill is sheared by the excavating device.

A relatively smooth surface is also desirable in the plastic indicating member in order that the backfill will have a reduced tendency to adhere to it. Thus, for example, when the bucket of the back hoe engages the film or plastic sheet it will be broken and either brought out of the excavation with the dirt and will be clearly obvious to the operator when the bucket is dumped or will slide out of the material being removed and will remain as a flag in the trench. It is usually desirable to provide a plastic indicating means having a color which is in sharp contrast to the color of the backfill in which it is buried. For example, in a reddish sand, clearly it is advantageous to employ a plastic strip of sharply contrasting color such as yellow or white, while if the backfill is yellow sand, often red, black, blue or a similar contrasting color is employed.

By way of further illustration, a 13.8 kilovolt power transmission line is placed in a trench measuring 14 inches wide and 7 feet deep, 12 inches of sand backfiill are placed over the cable, and a layer of polyethylene film 5 mils thick and 12 inches wide and pigmented red is laid over the 12 inch layer of backfill. The remainder of the excavation is filled with sand. Subsequently, a back hoe is employed to excavate around a damaged area of the cable. On removal of the sand containing the portion of the film broken sections of film are readily obvious both in the trench and in the material contained in the bucket.

In a similar manner, other lines may be buried employing the method of the invention in such plastic film indicating means as hereinbefore described. Commensurate success is obtained in such cases.

As is apparent from the foregoing specification, the method of the invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. In a method for the burying of underground lines which comprises placement of a line within an excavation, and subsequent backfilling, the improvement which comprises including within the backfill at a generally predetermined level adjacent the buried line an indicating means comprising a tearable plastic sheet.

2. In a method for the installation of buried lines which comprises excavating a trench, placing a line within said trench, and backfilling said trench, the improvement which comprises partially backfilling said trench to a predetermined level, placing within the trench a tearable plastic indicating sheet and subsequently completing the backfilling operation.

3. The method of claim 2, wherein the plastic sheet is a smooth surfaced plastic sheet.

4. The method of claim 2, wherein the plastic indicating sheet is a smooth surfaced plastic film having a color which is in sharp contrast to that of the backfill material employed.

5. The method of claim 2, wherein the plastic indicating sheet is a polyethylene plastic indicating sheet.

6. The method of claim 2, wherein the plastic indicating sheet has a pleated configuration.

7. The method of claim 2, wherein the plastic indicating sheet has a plurality of spaced weakened portions to facilitate tearing of the sheet on subsequent excavation.

8. The method of claim 2, wherein the plastic indicating sheet comprises a plurality of overlapped plastic sheets lightly adhered together.

9. The method of claim 2, wherein the plastic indicating sheet has printed indicia thereon.

10. A backfilled trench in the ground having a line adjacent the bottom thereof and positioned intermediate between said line and the surface of the ground a tearable plastic indicating sheet.

11. The trench of claim 10, wherein said plastic indicating means is a polyethylene film.

12. The trench of claim 10, wherein said plastic indicating sheet comprises a pleated plastic strip having pleats running in a direction generally normal to the direction of the line.

13. The trench of claim 10, wherein said indicating strip comprises a plastic sheet having weakened areas in the transverse direction of the sheet.

14. The trench of claim 10, wherein said sheet comprises a plurality of sheets lightly bonded together, each of said sheets being in partially overlapping relationship with adjacent sheets.

15. The trench of claim 10, wherein said plastic indicating sheet has a sharp color contrast to the background.

16. The trench of claim 10, wherein indicia are provided on said plastic sheet.

References Cited by the Examiner

UNITED STATES PATENTS

| | | | |
|---|---|---|---|
| 1,339,226 | 5/1920 | Schuster | 52—105 |
| 1,569,144 | 1/1926 | Scammell | 52—105 |
| 2,197,594 | 4/1940 | Rowell | 47—56 |
| 2,376,279 | 5/1945 | Schlenkert | 52—509 |
| 2,497,928 | 2/1950 | Cafiero. | |
| 2,536,196 | 1/1951 | MacLeod | 61—13 |
| 2,764,886 | 10/1956 | Wiesmann | 52—105 |
| 2,854,840 | 10/1958 | Anderson | 52—105 |
| 2,901,904 | 9/1959 | Wey | 52—396 |
| 2,916,854 | 12/1959 | Heigl et al. | 47—58 |
| 3,080,681 | 3/1963 | Merrill et al. | 47—56 |

FOREIGN PATENTS

| | | |
|---|---|---|
| 281,724 | 6/1928 | Great Britain. |
| 410,900 | 5/1934 | Great Britain. |
| 94,411 | 6/1960 | Holland. |

OTHER REFERENCES

Excavating Engineer, pages 26–29, August 1960.

EARL J. WITMER, *Primary Examiner.*

WILLIAM I. MUSHAKE, *Examiner.*

JACOB L. NACKENOFF, *Assistant Examiner.*